United States Patent [19]
deVries

[11] 4,378,851
[45] Apr. 5, 1983

[54] METHOD FOR INHIBITING EXPLOSIONS

[75] Inventor: Egbert deVries, Kettering, Ohio

[73] Assignee: Quad Environmental Technologies Corporation, Highland Park, Ill.

[21] Appl. No.: 185,024

[22] Filed: Sep. 8, 1980

[51] Int. Cl.³ .............................................. A62C 1/00
[52] U.S. Cl. ........................................ 169/45; 241/31
[58] Field of Search ...................... 169/43, 45, 46, 47, 169/54, 64, 66; 239/290, 75; 261/118, DIG. 15; 241/31, 38, 41, 16; 423/245

[56] References Cited

U.S. PATENT DOCUMENTS

| | | | |
|---|---|---|---|
| 2,565,420 | 8/1951 | Ayers | 241/31 |
| 3,621,918 | 11/1971 | Damron | 169/45 |
| 3,684,019 | 8/1972 | Emmons et al. | 169/47 |
| 3,763,634 | 10/1973 | Alliger | 261/118 |
| 3,971,642 | 7/1976 | Perez | 261/118 |
| 4,125,589 | 11/1978 | DeVries | 423/245 |
| 4,141,701 | 2/1979 | Ewan et al. | 261/118 |
| 4,238,461 | 12/1980 | DeVries | 239/75 |
| 4,244,529 | 1/1981 | De Gabriele et al. | 241/31 |

Primary Examiner—Joseph J. Rolla
Assistant Examiner—Kenneth Noland
Attorney, Agent, or Firm—Fidelman, Wolffe & Waldron

[57] ABSTRACT

The frequency of explosive events in mills and other processing equipment is reduced and their severity lessened by introducing an aqueous microdroplet dispersion of controlled particle size range into the equipment under conditions such as to ensure survival of an adequate microdroplet population during transit through the equipment. Droplet diameter is limited to a size range of less than about 20 microns so as to avoid impingement stripping of the droplets from suspension and the relative humidity of an air stream passing through the equipment is adjusted to avoid droplet loss through evaporation.

7 Claims, 1 Drawing Figure

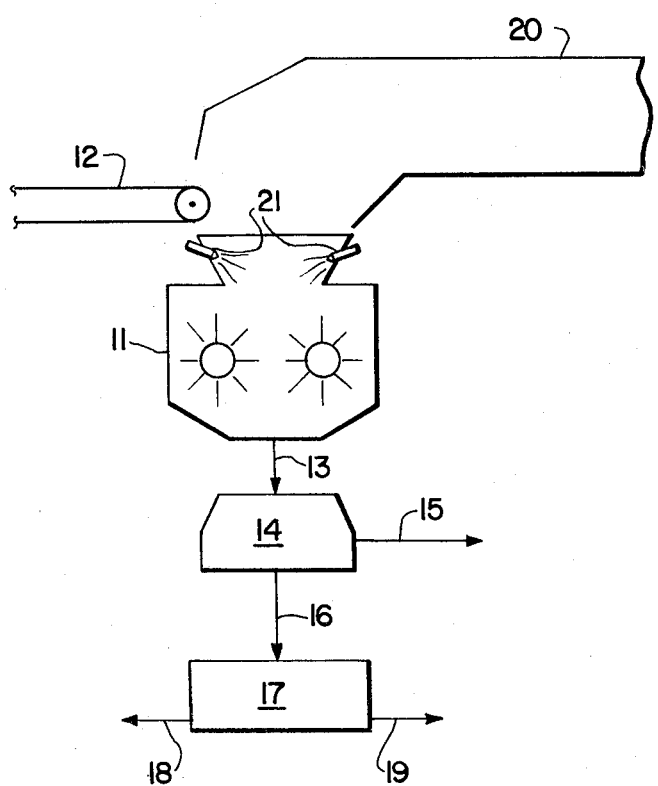

4,378,851

METHOD FOR INHIBITING EXPLOSIONS

BACKGROUND OF THE INVENTION

This invention relates generally to a method for reducing the incidence and severity of explosions in processing equipment such as impact mills comminuting combustible materials.

More specifically, this invention relates to the use of a micron-sized dispersion of water droplets within an impact mill to reduce explosion hazards therein.

It is becoming increasingly common to process municipal solid waste to recover and recycle at least some of the components thereof or to produce a shredded product more acceptable for landfilling. Shredding municipal refuse in a hammer mill, chain mill or the like is a necessary first step in obtaining a relatively homogeneous waste stream in which the components thereof are physically liberated and reduced in size so as to be amenable to automated classification and separation techniques.

Municipal solid waste is a diverse mixture of materials and typically contains a major portion of paper and paper products with lesser quantities of glass, steel and aluminum cans and all other materials discarded into trash. The inclusion of flammable liquids, including alcohol, gasoline, paint and paint solvents and the like within the trash is not unusual. Explosive materials including ammunition, powder, commercial explosives and military ordnance are occasionally encountered. Impact shredding of this diverse mixture results in relatively frequent explosions within the shredder as ignition sources are readily available both from sparks produced by the hammers striking metal and from localized temperature buildups within the shredder. In fact, through 1975 it has been reported that explosions occurred with a frequency of one explosion for every 85,000 tons shredded. About 70% of those explosions caused significant property damage.

It is recognized and accepted in the art that explosions of materials containing their own oxidant, military ordnance and commercial explosives, for example, cannot be suppressed or significantly attenuated. However, explosions from dust and flammable vapor or liquid are amenable to suppression or attenuation. Two general approaches to explosion suppression within impact mills have been taken in the art. In the first approach, a sensing device detects an incipient explosion and releases a charge of fire or ignition suppressing chemicals or gases into the mill. While this system is well proven in many applications, it does not work well in a hammer mill environment. Because of the large number of explosive events occurring in a typical hammer mill, often one or more per day, the cost in recharging the first suppressing chemicals or gases becomes prohibitive. As a result, the suppression system is often not recharged leading to a complete lack of explosion control.

A second approach to explosion suppression or attenuation was reported in a paper entitled, "An Approach to Energy Attenuation of Explosive Wastes in Processing Equipment," published in the Proceedings of the Sixth Mineral Waste Utilization Symposium, Chicago, Ill., May 2-3, 1978. This paper reported that a high pressure water spray through nozzles to produce a droplet dispersion having a median particle size in the general range of about 30 to 45 microns in the mill environment tended to significantly reduce the severity of explosions.

SUMMARY OF THE INVENTION

Incipient dust, gas or vapor explosions in processing equipment wherein flammable mixtures and ignition sources are at least occasionally produced are quenched or inhibited by maintaining in the equipment atmosphere a flame quenching concentration of aqueous microdroplets. Survival of the microdroplets during transit through the equipment is ensured by control of droplet size and of relative humidity.

Hence, it is an object of this invention to quench incipient gas, dust or vapor explosions in processing equipment.

Another object of this invention is to ensure survival of aqueous microdroplets during transit through processing equipment.

A specific object of this invention is to reduce the frequency and lessen the severity of explosive events within impact mills and similar equipment.

Another object of this invention is to provide a method to lessen the hazards in the shredding of domestic solid waste.

DESCRIPTION OF THE DRAWING

The FIGURE comprises a diagrammatic flow sheet illustrating a specific embodiment of the invention.

DISCUSSION OF THE INVENTION

It has been well established in the art that a water spray, particularly one of very small particle size, can halt the propagation of an explosive flame front, can reduce the frequency, and can attenuate the energy produced in a dust or vapor explosion. Application of this technique to a hammer mill or similar device used in the dry shredding of municipal wastes and similar materials has shown promise but results to date have been erratic and not completely satisfactory.

The art has failed to appreciate that, to be effective, the water droplets must in large part survive passage through the mill. While minimum droplet concentrations necessary to inhibit or suppress flame propagation have been calculated and at least in part experimentally verified, the actual concentration of water droplets within the environment of an impact mill has been ignored. The effective concentration of water droplets in air within a mill has now been found to be only indirectly dependent upon the droplet concentration introduced into the mill. A consideration of the environment existing within a hammer mill during the shredding operation will serve to explain this apparent anomaly.

During the shredding of municipal wastes, there is typically present within the mill a high concentration of paper and paper fragments circulating at a relatively high velocity. If a water droplet impacts upon a paper surface, it is immediately absorbed thereon thus removing the droplet from suspension. Other materials within the mill having water wettable surfaces tend to act in the same fashion. Thus, the mill can be considered to act as an impingement-type demister effectively stripping water droplets from the air stream. Because the water droplets are effective to inhibit or suppress explosions only while they are in air suspension in adequate concentration, depletion of the water droplet concentration by contact with and absorption on paper and other materials serves to negate their explosion inhibiting function.

Increasing the concentration or amount of water droplets introduced into the mill will tend to increase the effectiveness of explosion suppression but an excess of water adversely affects subsequent materials classification and separation processes. In most solid waste treatment processes, an air classification step in which paper, plastic film and other combustibles are separated from the heavier residue, follows the shredding step. An excess of moisture interferes with the efficiency of air classification and adds undesirable moisture to a product fraction destined for use as a fuel. In a mining application wherein the mined product is subsequently dried, a greater amount of energy is required to evaporate the excess moisture.

Applicant has found that the particle size or droplet diameter of the water spray introduced into the environment of a hammer mill or like device is crucial to ensuring an adequate concentration of droplets throughout the mill volume. Water droplets having a diameter below about 20 microns, and preferably below about 10 microns, are able to survive passage through an operating mill in far higher proportion then can droplets which are even slightly larger, on the order of 25 to 50 microns, in diameter. Solid objects which are in motion relative to a gas such as air carry a surface film of stagnant or absorbed gas. A water droplet below a certain crucial size, on the order of about 20 microns, has insufficient mass and momentum to penetrate this stagnant surface film but instead tends to flow with the moving gas stream around solid objects. Because the volume (and hence the mass) of a spherical water droplet is proportional to the cube of the diameter, seemingly slight differences in diameter, as between 20 and 30 microns, have a disproportionate effect upon the interaction of water droplets suspended in an air stream with solids moving relative to that air stream.

Merely changing the size of the water droplets introduced into a mill environment, to a size range below about 20 microns, is not sufficient to ensure a high survival rate of the droplets within a mill. Because of the extremely high ratio of surface area to mass of a droplet dispersion of this size range, evaporation of the droplets with an attendant depletion of their population within an air stream is extremely rapid. Hence, it is also necessary to either provide droplets in sufficient quantity to essentially saturate the air stream and to leave a residual population of droplets in sufficient concentration to suppress an explosion or to pre-humidify the air entering the mill prior to introduction of the microdroplet dispersion. Because the energy requirements for producing a microdroplet or aerosol dispersion having a droplet diameter ranging from about 1 to about 20 microns are greater than for many other humidification methods, a pre-humidification step applied to the air stream entering the mill may be advantageous. Humidification may be accomplished by passing the air through a coarse water spray in a contacting tower or by use of other similar techniques.

Formation of a water droplet dispersion having a maximum droplet size of about 20 microns may be accomplished by use of a number of different commercially available nozzles. For example, ultrasonic nozzles of the general type disclosed in U.S. Pat. No. 2,532,554 are capable of producing a droplet dispersion in this size range. Nozzles of the type in which a gas orifice penetrates a liquid filming surface, such as are disclosed in U.S. Pat. No. 4,161,281, can also produce a micro-fog of the required droplet size.

In those instances wherein the relative humidity of the ambient process environment is relatively low and wherein humidification of the air stream is accomplished through evaporation of a portion of the droplet dispersion, it may be advantageous to adjust the droplet size and volume of the spray according to the temperature and relative humidity of the air stream in the general manner set out in applicant's co-pending patent application Ser. No. 080,792, now U.S. Pat. No. 4,238,461. Use of the technique described in that patent application would allow the use of a somewhat larger droplet diameter spray which upon equilibrium with the air stream would leave a residual droplet population within the desired under 20 micron size range.

In another embodiment, a micro-fog droplet dispersion is produced by a jet pump or ejector employing steam as a motive fluid. Water is metered into the suction entry of a steam driven ejector which is discharged into an air stream. The air stream is maintained at a temperature below the steam temperature, and the relative humidity of the air stream is maintained at a sufficiently high level, preferably at or near saturation, to result in a condensation of the ejector exhaust to form a microdroplet dispersion having the general appearance of a natural fog. In some instances, as in the shredding of municipal solid waste containing food wastes or garbage, it may be advantageous to supply an aqueous solution of sodium hypochlorite or other oxidizing chemical rather than water to the suction entry of the ejector or to the spray nozzles. Relatively low concentrations of sodium hypochlorite in a microdroplet dispersion are effective to react with and neutralize common food-derived odors. Thus, in addition to suppressing or attenuating dust and vapor explosions, a significant degree of odor control can be obtained as well. The use of a steam driven ejector to produce a microfog dispersion of reagent containing aerosol droplets is described and claimed in copending, commonly assigned patent application Ser. No. 167,482, filed July 11, 1980, now U.S. Pat. No. 4,308,241.

DESCRIPTION OF PREFERRED EMBODIMENTS

The process of this invention is applicable for use in or with processing equipment wherein combustible mixtures are exposed to ignition sources. Specific embodiments of this invention will be described in relation to the FIGURE which comprises a schematic representation of the use of the inventive process to suppress or attenuate dust and vapor explosions in a mill shredding a municipal solid waste. Referring now to the FIGURE, shredding mill 11 is adapted to receive and suitably comminute a waste stream delivered to the mill by conveyor 12. Mill 11 may comprise a hammer mill, flail mill, double opposed chain mill or other similar device capable of shredding paper and comminuting other components of the waste stream to a size range whereat physical liberation of the waste components is achieved. A shredded refuse stream 13 is passed to a first separation zone 14 which typically may comprise an air classifier. There is recovered from zone 14 a light fraction 15 comprising paper, cardboard, light plastics and similar materials which may be utilized as a refuse derived fuel or may be subjected to further upgrading steps to obtain a recyclable paper fraction. Heavy fraction 16 may be passed to second separation zone 17 where it may be treated in a variety of ways including magnetic separation, physical sizing, water or air elutriation and the like to obtain product fractions 18 and 19. Alternately, shredded refuse stream 13 may be compacted for transport to and disposal in a landfill.

Air is drawn into mill 11 in substantial volume because of the fan-like action of the rotating mill and because, in many cases, an induced draft is applied to the mill exit through action of air classifier 14. A conditioned air stream may be supplied to the mill entry through hood and duct means 20. It is often advantageous that the air stream supplied to the mill entry be conditioned by humidity adjustment so that it is at or near 100% relative humidity. Conditioning may be accomplished by passing the air stream through a water spray in a contacting tower or similar device in a manner well known to the art. Because humidification can be accomplished by using a low pressure, relatively coarse water spray, this method of humidification is more energy efficient than most other approaches.

One or more microdroplet producing devices 21 are disposed in proximity to the entry of mill 11. The droplet producing devices may be located within hood and duct means 20 at a point near the mill entry or they may be located within the entry area of the mill as is illustrated. If located in the mill entry area, it is essential that the devices be protected from blinding by waste introduced into the mill and also protected from ballistic impact from objects within the mill. Because of the high vibration inherent in the operation of an impact mill, care must also be taken to avoid vibratory failure of air, steam and water lines supplying the devices mounted directly to the mill. In some cases it may be advantageous to mount the devices within the hood and duct structure 20.

As set out previously, microdroplet producing devices 21 may be either of the nozzle or steam driven ejector type so long as they are operable to produce a fog-like aerosol having a maximum particle size on the order of about 20 microns. It is to be recognized that all devices of this sort produce droplets in a range of sizes and that a minor fraction of droplets larger than about 20 microns will not appreciably detract from the efficiency of the process. As has been set out previously, equilibrium of the microdroplet dispersion with a non-saturated air stream will tend to reduce the average droplet size.

The droplet producing devices must have a capacity adequate to provide a droplet concentration in the air stream exiting the mill sufficient to quench an incipient dust, gas or vapor explosion. It has been recognized in the art that a combustible, hydrocarbon-air mixture will not propagate through pathways narrower than about 0.20 to 0.25 cm. Hence, the droplet concentration in the air stream exiting the mill must be adequate to provide a droplet spacing of less than about 0.20 cm. At a droplet spacing of 0.20 cm, there is required about $3.5\times10^6$ droplets per $ft^3$. A gallon of water will produce about $3.8\times10^{12}$ particles or droplets of 10 micron diameter. Thus, a gallon of water is sufficient to produce the minimum required concentration of 10-micron droplets for approximately $10^6$ $ft^3$ of air. In contrast, were 100-micron droplets to be used, it would require 1000 gallons of water to achieve the same droplet spacing in the same volume of air.

The actual concentration of droplets which must be introduced into the mill is substantially higher. Droplets will evaporate until the air stream is substantially saturated with water vapor. Even if the air entering the mill is at 100% relative humidity, evaporation will occur within the mill because of heating produced by friction and impact of the solids being comminuted. A certain proportion of the droplets will interact with and be absorbed on dust particles and solid surfaces circulating in the mill. As those factors which deplete the droplet population are dependent upon the operating conditions of the individual installation, no precise guide for droplet introduction rate may be given. Rather, the droplet introduction rate must be sufficient to provide a certain minimum droplet concentration at the mill exit as has previously been described. A proper droplet introduction rate can, however, be visually monitored at the mill exit. The light scattering characteristics of a droplet suspension are greatly affected by the droplet size. Very fine droplet suspension, 20-micron or less, are easily recognized by the whitish character and the translucent to opaque quality of the mist. Therefore, a white, opaque appearance of the air stream exiting the mill is indicative of a droplet concentration sufficient to inhibit or quench incipient explosions. Thus, the droplet introduction rate at the mill entry may be controlled by the appearance of the air stream at the mill exit.

From the operating experience to date, it is apparent that one effect of the inventive process in controlling explosions is the reduction of dust levels within the mill and in subsequent processing steps. One common explosion mechanism is postulated to be as follows. There is a primary explosion in the mill caused by the release and ignition of a flammable substance such as paint thinner, alcohol or similar volatile liquid. The force of this primary explosion tends to increase the dust load in the air stream and a secondary dust explosion follows. This secondary explosion propagates to the limits of flammable concentrations of dust in the air and is typically far more powerful than is the primary explosion. Reduction of the dust load carried by the air stream in most cases completely eliminates these secondary explosions and in all cases reduces their potential severity.

The process acts to substantially reduce the number of primary explosions as well. The suspension of closely-spaced water droplets in the air stream acts in much the same fashion as does the metal gauze or screen used in the traditional safety lamp and Meker burner to suppress the propagation of a flame front. It is probable that sparking within the mill is reduced because of the more humid atmosphere. Some decrease in oxygen content within the mill results from dilution of the air with water vapor. Heat buildup within the mill is reduced because of the cooling effect of evaporating water droplets which further results in lowering somewhat the vapor pressure of flammable liquids released within the mill.

Water droplets are effective to quench the flame front developing from either a primary or secondary explosion because of the latent heat absorbed upon droplet vaporization. Small droplets are far more effective than are larger droplets because their much greater surface area to mass ratio allows much faster heating of individual droplets to the boiling point and a much greater heat transfer rate from the flame front to the droplets. As soon as the temperature of the flame front falls below the ignition temperature of the fuel upon which it is feeding the spread of the flame front, and the developing explosion, is quenched.

The following example sets out results obtained in one trial of the process on a hammer mill shredding municipal trash and garbage.

EXAMPLE

A pressure sensing transducer was installed in communication with the interior area of a hammer mill used in the shredding of municipal solid wastes. The transducer output was continuously recorded on a chart and registered sudden pressure buildups, or events, caused by explosions within the mill. Mill operation was monitored for a period of eight days in order to determine the frequency of explosive event occurrences. The following data were obtained:

TABLE 1

| Day | No. of Events |
| --- | --- |
| 1 | 3 |
| 2 | 0 |
| 3 | 2 |
| 4 | 0 |
| 5 | 1 |
| 6 | 2 |
| 7 | 0 |
| 8 | 0 |

During the eight-day monitoring period, eight explosive events occurred, or an average of one event per day. Thereafter, nozzles of the ultrasonic type were installed at the inlet of the hammer mill in a manner such that the nozzle plume was directed into the mill. Pressure and flow rate of air and water supplied to the nozzles were adjusted to produce a spray having a particle diameter of about 10 microns. Total volume of the micro-fog spray was increased until the air stream exiting the mill had a whitish, opaque appearance thus indicating the survival of an adequate population of water microdroplets after passage through the mill.

Mill operation was then monitored for the occurrence of explosive events and the following data were obtained:

TABLE 2

| Day | No. of Events |
| --- | --- |
| 1 | 0 |
| 2 | 1 |
| 3 | 0 |
| 4 | 0 |
| 5 | 0 |
| 6 | 0 |
| 7 | 0 |
| 8 | Major Explosion |

The major explosion occurring on the eighth day was of sufficient intensity to blow the top of the hammer mill off and to destroy a section of concrete roof in the enclosure building. An investigation of the explosion determined that it was caused by a self-oxidizing explosive, possibly a piece of military ordnance. As has been set out previously, no type of explosion suppression device can protect against a self-oxidizing explosive. The explosion terminated the experiment.

Prior to the major explosion, only one explosive event was recorded and this event was of much lessened severity (lower pressure rise) than was typically experienced in the absence of the microdroplet spray.

As can now be appreciated, the prior art has recognized that a water droplet suspension acts to quench or suppress a dust or vapor explosion but has failed to recognize the importance of droplet size and humidity condition in ensuring droplet survival in a mill environment.

While this invention has been described in relation to an impact mill used in the shredding of municipal wastes, its use is not so limited. Rather, it may find use in other processing equipment and in other environments wherein combustible mixtures are exposed to ignition sources.

I claim:

1. A method for suppressing or attenuating explosions within processing equipment having an entrance and an exit in which flammable mixtures of air with gas, dust or vapor are at least occasionally produced which comprises introducing into said equipment a sufficient quantity of aqueous microdroplets having a diameter less than about 20 microns to provide a droplet concentration in the air throughout the equipment including at the equipment exit sufficient to quench an incipient gas, dust or vapor explosion and the droplet concentration in the air at the equipment exit is sufficient to provide a spacing between individual droplets of less than about 0.2 cm.

2. The method of claim 1 wherein said equipment is an impact mill.

3. The method of claim 2 wherein the air stream entering said mill is conditioned by humidification prior to introducing said aqueous microdroplets therein.

4. The method of claim 3, wherein a small amount of a water soluble oxidizing chemical is introduced into the processing equipment.

5. The method of claim 2 wherein municipal solid waste is shredded in said impact mill and wherein said aqueous microdroplets have a maximum diameter of less than about 10 microns.

6. A method for suppressing or attenuating explosions within processing equipment having an entrance and an exit in which flammable mixtures of air with gas, dust or vapor are at least occasionally produced which comprises introducing into said equipment a sufficient quantity of aqueous microdroplets having a diameter less than about 20 microns to provide a droplet concentration in the air throughout the equipment including at the equipment exit sufficient to quench an incipient gas, dust or vapor explosion and the droplet concentration is such that the spacing between individual micro droplets is such that the passages or pathways throughout the mass of said microdroplets are sufficiently narrow to prevent flame progagation in said flammable mixtures.

7. A method for maintaining the concentration of aqueous microdroplets in processing equipment, wherein flammable mixtures of air with dust, gas or vapor are at least occasionally produced, at a level sufficiently high so as to quench incipient explosions which comprises:
  limiting the particle size of said aqueous microdroplets introduced into said equipment to a maximum diameter of about 20 microns,
  wherein the concentration is such that spacing between the individual microdroplets is such that the passages or pathways throughout the mass of said microdroplets are sufficiently narrow to prevent flame propagation in said flammable mixtures, and
  maintaining the relative humidity of air passing through said equipment at a sufficiently high level as to minimize evaporation of said droplets.

* * * * *